United States Patent

Van Der Lely

[15] 3,687,376
[45] Aug. 29, 1972

[54] FERTILIZER SPREADERS

[72] Inventor: Cornelis Van Der Lely, 7, Bruschenrain, Zug, Switzerland

[22] Filed: Nov. 17, 1970

[21] Appl. No.: 90,274

[30] Foreign Application Priority Data

Nov. 24, 1969 Netherlands............6917642

[52] U.S. Cl. ..............239/661, 239/656, 239/675, 239/684
[51] Int. Cl..............................................A01c 17/00
[58] Field of Search......239/656, 661, 675, 673, 687, 239/681, 651, 668, 679, 684

[56] References Cited

UNITED STATES PATENTS

| | | | |
|---|---|---|---|
| 2,532,518 | 12/1950 | Scott | 239/661 |
| 3,043,455 | 7/1962 | Post | 239/670 X |
| 3,317,213 | 5/1967 | Van Der Lely | 239/661 |
| 2,538,886 | 1/1951 | Skibbe et al. | 239/675 X |
| 2,652,261 | 9/1953 | Presler | 239/661 |
| 3,488,007 | 1/1970 | Neuenschwander | 239/687 |
| 3,101,791 | 8/1963 | Londersele | 239/670 X |
| 2,941,811 | 6/1960 | Sherer | 239/683 X |
| 2,673,741 | 3/1954 | Durand | 239/661 X |
| 2,638,350 | 5/1953 | Lyerly | 239/661 |

Primary Examiner—M. Henson Wood, Jr.
Assistant Examiner—John J. Love
Attorney—Mason, Mason & Albright

[57] ABSTRACT

A spreader implement with a hopper of extra large capacity has a frame that can be attached to the three point lift of a tractor. The hopper has a lower vertical portion, with a rotary spreader disc mounted below an outlet in the hopper bottom, and an upwardly extending horizontal portion that can have an extension for additional capacity. The upper portion extends over the tractor seat and is proportionately wide. Conveyors can be mounted within the upper portion to move material back to the vertical portion. An eccentric connects the conveyors and the drive which also powers the spreader disc. The hopper is multisided with the walls angled relative to one another and the center of gravity located adjacent the three point connection. Also, the upper portion can be divided into two compartments, each with a worm conveyor. The frame includes inter-connected beams with a lower beam support for resting the implement on the ground during non-use.

31 Claims, 6 Drawing Figures

Patented Aug. 29, 1972

INVENTOR
CORNELIS VAN DER LELY
BY
Mason, Mason & Albright
Attorneys

INVENTOR
CORNELIS VAN DER LELY

Patented Aug. 29, 1972

INVENTOR
CORNELIS VAN DER LELY
BY
Moon, Moon & Albright
Attorneys

FERTILIZER SPREADERS

The invention has for its object inter alia to provide a fertilizer spreader of this kind which can be advantageously coupled with a tractor or a similar vehicle.

According to the invention this can be achieved by extending the hopper of a capacity of more than 1,500 liters towards the side of the implement provided with the fastening means so that the center of gravity of the spreader with the filled hopper is located, on plan, near the fastening means. The spreader can thus be provided with a hopper of high capacity. With the construction of the spreader in accordance with the invention the weight of the implement can be advantageously held by the tractor.

An advantageous device embodying the invention is obtained by providing the hopper with a lower portion which extends mainly in a direction of height and which is provided with an upper portion, extending away from said lower portion substantially in a horizontal direction towards the side of the fastening means on the spreader beyond the lower portion.

According to a further aspect the invention relates to a fertilizer distributor or a similar agricultural implement comprising a frame, a hopper arranged on said frame and a spreading member, in which in accordance with the invention the hopper comprises on the top side a horizontal portion in which at least one conveying member is mounted for conveying the material from this portion towards a lower portion of the hopper, the conveying member being housed solely in the upper portion of the hopper.

According to a further aspect of the device embodying the invention the spreading member is pivotally arranged in the frame of the device so that with respect to the hopper it can be set in at least two positions.

For a better understanding of the invention and to show how the same may be carried into effect, reference is made by way of example to the accompanying drawings, which shows two embodiments of implements in accordance with the invention.

Figure 1:
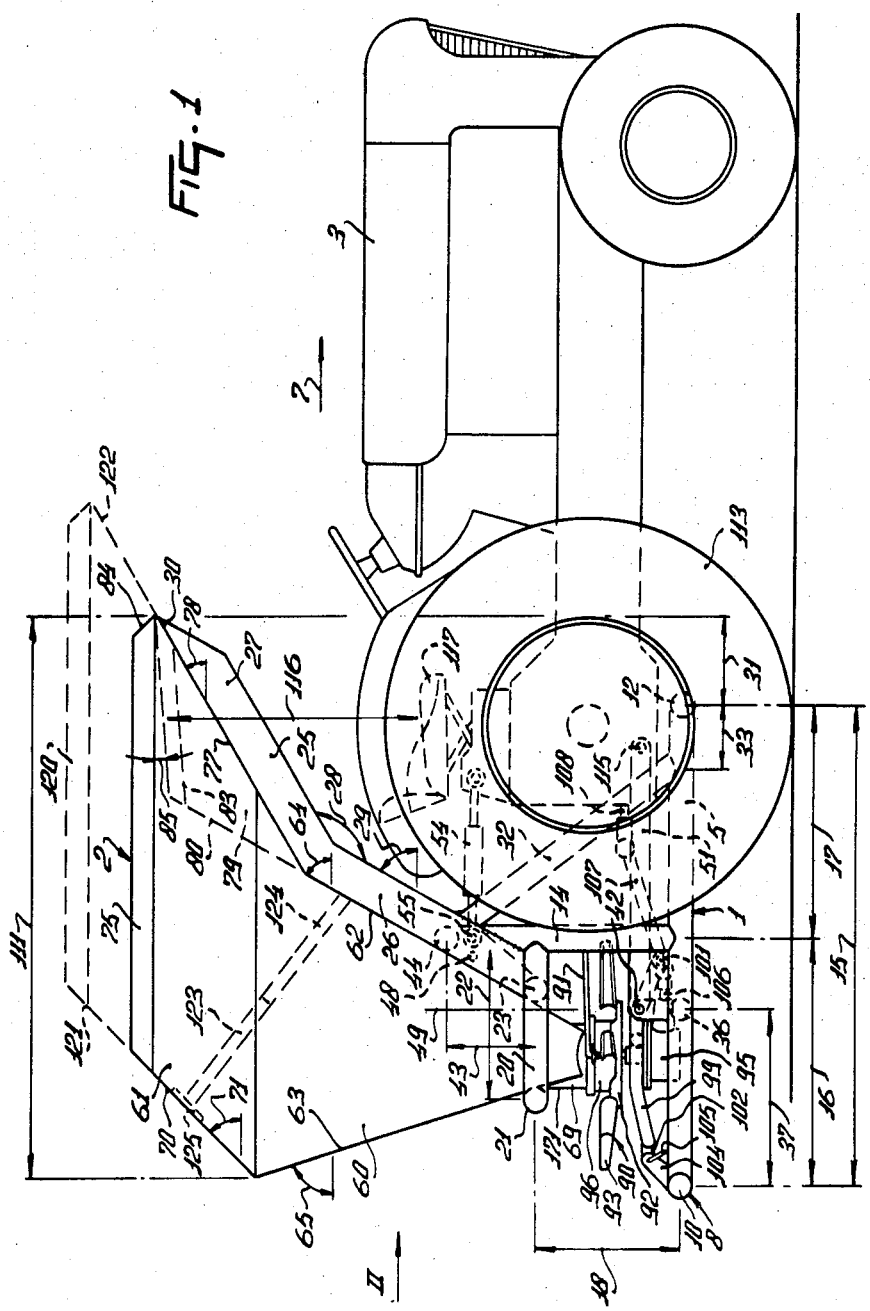
FIG. 1 is a side elevation of a first embodiment of a device in accordance with the invention for distributing material.
Figure 2:
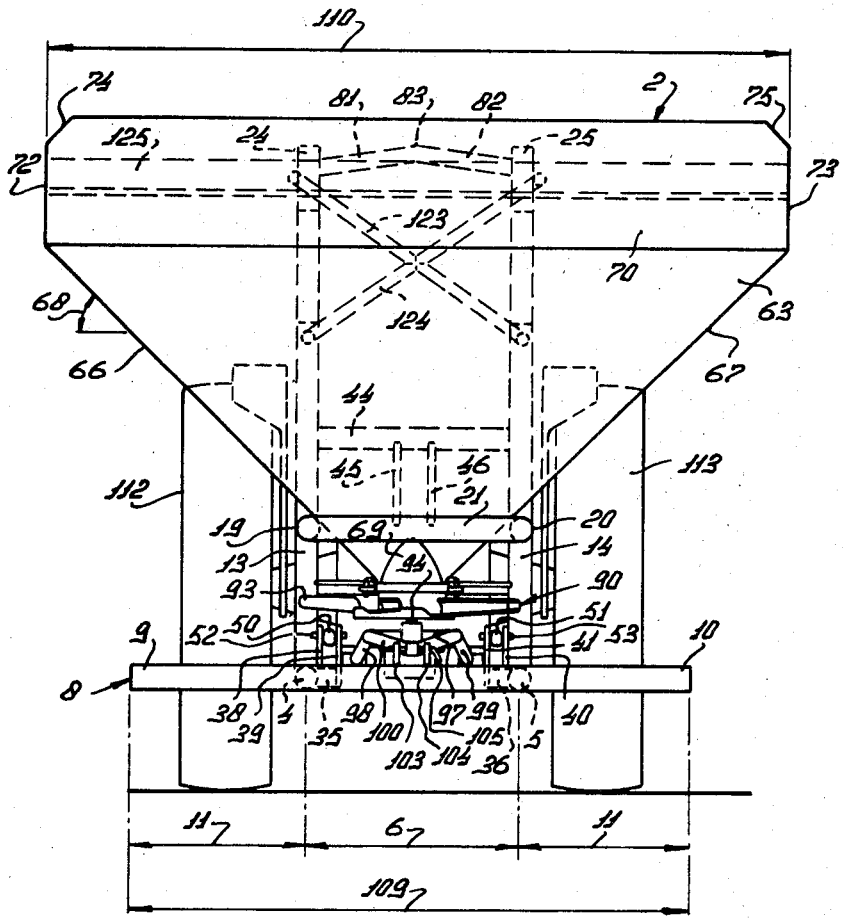
FIG. 2 is a rear view of the device shown in FIG. 1, taken in the direction of the arrow II in FIG. 1.
Figure 3:
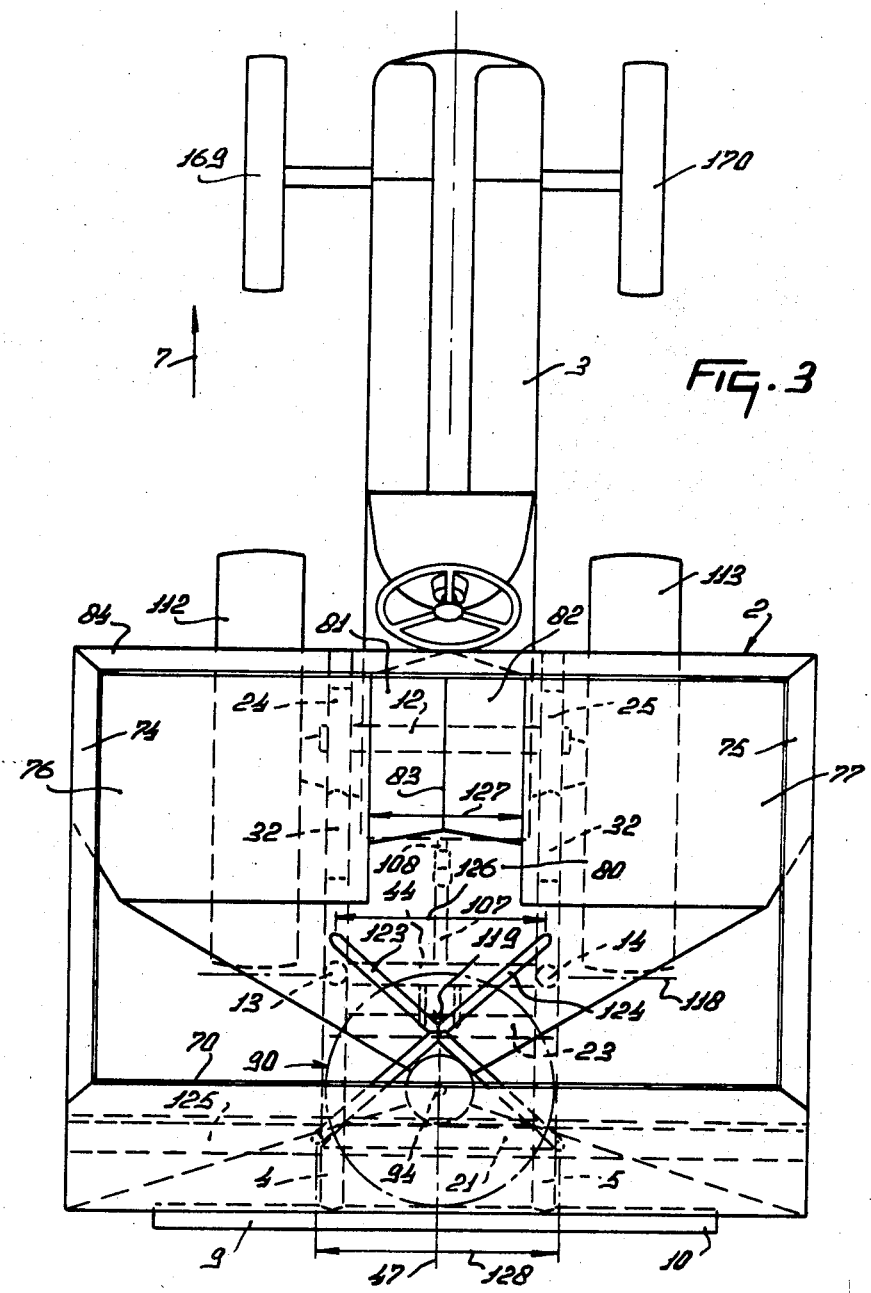
FIG. 3 is a plan view of the device shown in FIGS. 1 and 2.

The device shown in FIGS. 1, 2 and 3 comprises a frame 1, on which a hopper 2 is arranged. The device is coupled with the lifting device of a tractor 3. The frame 1 comprises two frame beams 4 and 5, which extend parallel to each other and to the direction of movement 7 of the device. The frame beams 4 and 5 are spaced apart by a distance of about 80 cms in this embodiment. The rear ends of the frame beams 4 and 5 are secured to a transverse beam 8, which extends at right angles to the direction of movement 7. The transverse beam 8 has ends 9 and 10 extending over a distance 11 at the sides of the frame beams 4 and 5. The frame beams 4, 5 and 8 are located at the same level and extend in a horizontal direction, when the device is in use as is shown in the Figures. The front ends of the beams 4 and 5 are interconnected by a connecting beam 12, located at the same level as the frame 4 and 5. The beam 12 extends parallel to the beam 8.

Approximately at the center of the length 15 of the beam 4 a vertical beam 13 is secured thereto and extends in upward direction, whereas a vertical beam 14, extending in upward direction is secured to the beam 5, approximately at the center of the latter. The beams 13 and 14 are secured at distances 16 and 17 from the ends of the beams 4 and 5, which distances are equal to each other. At a height 18 above the frame beams 4 and 5 horizontal supporting beams 19 and 20 are secured to the vertical beams 13 and 14, said beams extending parallel to the beams 4 and 5 and extending to the rear away from the beams 13 and 14 with respect to the direction of movement 7. The rear ends of the supporting beams 19 and 20 are interconnected by a connecting beam 21. The beams 19 and 20 extend over a distance 22, which is about three-fifths of the length 16. Near the joints between the supporting beams 19 and 20 and the vertical beams 13 and 14 are intermediate beam 23 extends parallel to the beam 21 between the beams 19 and 20. The lower end of the supporting beam 19 has secured to it the lower end of a stay beam 24 whereas the front end of the supporting beam 20 has fastened to it the lower end of a stay beam 25. The stay beams 24 and 25 have identical shapes and extend parallel to a vertical plane in the direction of movement 7 of the device. The beams 24 and 25 preferably have a rectangular section and may be formed by a closed square beam or a channel-section beam. Each of the stay beams 24 and 25, as is shown in FIG. 1 for the beam 25, comprises a portion 26 and a portion 27, which are at an angle 28 of about 150° to each other. The portion 26 is inclined forwardly in upward direction at an angle 29 of about 60° to the horizontal plane. The portion 27 extends to the front away from the portion 26. The portions 26 and 27 have approximately equal lengths. The end 30 of the beam 25, like the front end of the beam 24, viewed from a side (FIG. 1) is at a distance 31 from the beam 12. The distance 31 is approximately equal to one-sixth of the length 15 of the beams 4 and 5. The top ends of the beams 13 and 14 project above the horizontal supporting beams 19 and 20 and are secured to the lower ends of the beams 24 and 25. Between the beam 25 and the beam 5 a strut 32 is arranged. The strut 32 is secured to the beam 25 just above the connection of the beam 14 with the beam 25. The lower end of the strut 32 is secured at a distance 33 approximately equal to one-sixth of the length 13 of the beam 5 from the front end of the latter to said beam. In the same manner as described for the strut 32 the beams 24 and 4 have arranged between them a strut, which is not shown in the drawings. A support 35 is secured on the side of the beam 4 facing the beam 5 and support 36 is secured to the beam 5 on the side of the latter which faces the beam 4. The supports 35 and 36 are located at a distance 37 from the rear ends of the beams 4 and 5, the distance 37 being approximately equal to one third of the length 15 of the beams 4 and 5. The support 35 is provided with two vertical strips 38 and 39 at a short distance from each other as is shown in FIG. 2, the strip 38 lies by one side in the vertical plane going through the side of the beam 4 facing the beam 5. The support 36 is provided with two strips 40 and 41, also located at a short distance from each other. The strip 40 is located by one side in the vertical plane going through one side of the beam 5. The strips 38, 39 and the strips 41, 40 have at their top ends holes 42. The holes of the four strips register with each other.

Between the beams 24 and 25 a connecting beam 44 is arranged at a distance 43 above the beams 19 and 20. This connecting beam 44 extends parallel to the intermediate beam 23. Fastening strips 45 and 46 are provided between the beam 44 and the intermediate beam 23. These strips 45 and 46 are at a short distance from each other and each at the same distance on either side from the vertical plane 47 going through the longitudinal center line of the device in the direction of movement thereof. Near the top ends of the fastening strips 45 and 46 holes 48 and 49 are provided in each of them, which are approximately at the same level. The holes 48 and 49 in the fastening strips 45 register with corresponding holes in the fastening strip 46. The strips 38, 39, 40 and 41 and the fastening strips 45 and 46 form coupling means by which the device can be hitched to the lifting device of the tractor 3. The strips 38 and 39 can be coupled with the lower lifting arm 50 by inserting a pin into the relevant holes 42 and a fastening eyelet at the end of the lifting arm 50. The lifting arm 51 has its end located between the strips 41 and 40 and can be connected herewith by inserting a pin 53 into the relevant holes 42 at the strips 41 and 40 and into eyelet at the end of the arm 51. The rear end of the upper lifting arm 54 of the lifting device of the tractor is arranged between the fastening strips 45 and 46, the arm being secured to the strips by inserting a pin 55 into the holes 48 and into an eyelet of the arm 54. By arranging each of the arms 50, 51 and 54 between two strips a satisfactory attachment of the device to the lifting arms is obtained. If desired, the arm 54 may be coupled with the fastening strips 45 and 46 by inserting the pin 55 into the holes 49 and into an eye at the end of the lifting arm.

If desired, the connection of the support 35 with the beam 4 may be stiffened by arranging a stay plate between the top side of the beam 4 and the side of the strip 38 remote from the strip 39. In a similar manner the connection of the support 36 with the beam 5 may be reinforced by a stay plate between the beam 5 and the strip 40. These reinforcements by means of the stay plates are not shown in the drawing.

The hopper 2 is secured to the frame. The hopper 2 comprises a lower portion 60, extending mainly in upward direction and an upper portion 61, extending more horizontally. The hopper portion 60 has a front wall 62 and a rear wall 63. The front wall 62 extends, viewed in the direction of movement, from bottom to top in an inclined position at an angle 64 of about 60° to the horizontal plane. The rear wall 63 extends from bottom to top in inclined position to the rear at an angle 65 of about 75° to the horizontal plane. The hopper portion 60 comprises two sidewalls 66 and 67, diverging in upward direction and being at equal angles to the horizontal plane. This angle 68 (FIG. 2) is about 45°. On the bottom side the hopper has a cylindrical delivery portion 69, which is completely open at the bottom. The upper portion 61 of the hopper has a rear wall 70, which joins the upper side of the wall 63 and is inclined from said wall in forward direction at an angle 71 of about 75° to the horizontal plane. The wall 70 joins by its sides the sidewalls 72 and 73 of the upper hopper portion. These sidewalls 72 and 73 extend vertically, when the device is standing upright at the upper edges the sidewalls 72 and 73 have inwardly bent-over rims 74 and 75. The upper hopper portion 61 has at the front two wall portions 76 and 77, the lower ends of which join the upper side of the front wall 62, from which they are inclined upwardly to the front at an angle 78 of about 30° to the horizontal plane (FIG. 1). Between the front wall portions 76 and 77 is formed a re-entrant part or cavity 79, which projects so to say inside the hopper. This cavity is formed by a wall portion 80 in line with the front wall 62. Between the wall portions 76 and 77 is arranged a roof-shaped wall portion formed by the parts 81 and 82. These parts 81 and 82 are connected with each other in the vertical plane 47 going through the center line of the device and are inclined away from said joint in downward direction at an angle of about 5°. At the front of the hopper an inwardly inclined rim 84 is provided on the top side, the front end of the rim 83 joining the lower side of said rim 84. The rim 83 and the wall portions 81 and 82 extend from the front side at an angle 85 of about 5° in downward direction.

Beneath the delivery spout 69 the device comprises a spreading member 90, which comprises an ejecting member having a plate-shaped central portion 92, adapted to rotate about a shaft 91, extending, in operation in upward direction or vertically, ejecting arms 93 being fastened to said central portion. The spreading member 90 is fastened to a shaft 94, journalled in a gear box 95. Between the spreading member 90 and the delivery portion 69 a dosing mechanism 96 is provided for regulating the quantity of material to be fed per unit time from the hopper to the spreading member. It furthermore permits of modifying and adjusting the place delivery of the material to the spreading member relative to the shaft 91 in order to determine the direction of distribution of the material relative to the vertical plane 47. The dosing mechanism 96, comprising a cylindrical ring having one or more outlet ports and a closing member for the port or ports, is not shown in detail in the drawing. The gear box 95 is fastened to a supporting beam 79. The beam 79 is arranged between the limbs 98 and 99 of a V-shaped supporting member 100, which is pivoted by the front ends of the limbs 98 and 99 by a pivotal shaft 101 to the frame beams 4 and 5 respectively. On the rear side the supporting member 100 is provided with a strip 102, fitting between two tags 103 and 104 on the frame 8. The strip 102 and the tags 103 and 104 have registering holes, through which a locking pin 105 can be passed for fixing the supporting member 100 relatively to the frame 1.

The device according to the invention is particularly suitable for use as an agricultural implement for distributing material, for example, fertilizers. As is described with reference to the embodiment shown in FIGS. 1 to 3, the device can be coupled for this purpose to the lifting device of a tractor. The hopper 2 can receive the material to be distributed. For transporting the device with the material in the hopper the dosing mechanism 96 can be closed so that no material will flow out of the hopper or be spread away. When the material has to be spread, the dosing mechanism 96 can be adjusted so that the material can flow out of the hopper 2 to the spreading member 90. The quantity of material to be fed per unit time to the spreading member can be adjusted, as stated above, by the dosing mechanism 96. The spreading member is caused to rotate about the vertical shaft 91, the spreading member being driven via the vertical shaft 94 from the gear box 95. The gear box 95 comprises an input shaft 106, which is coupled by means of an auxiliary shaft 107 with the power take-off shaft 108 of the tractor. The transmission in the gear box 95 can thus be driven by the power take-off shaft 108.

When the hopper 2 is to be filled, the device may be coupled with the lifting device of the tractor, as is shown in FIG. 1. The device may, however, be held on the ground, in which case it is held by the beams 4, 5, 8 and 12. When standing on the ground the horizontal lower side of the frame formed by the beams 4, 5, 8 and 12 forms a satisfactory support because, on plan, the beam 8 is located near the rear side of the device and extends over a length 109, which exceeds half of the width 110 of the device. The width 110 is determined by the width of the hopper of 250 cms. In this embodiment the width 109 is approximately equal to four-fifths of the width 110. The length 15 of beams 4 and 5 is slightly shorter than the length 111 of the hopper 2 measured in the direction of movement 7 of the device. The length 15 is about seven-eighths of the length 111. The beam 12 extends only between the front ends of the beams 4 and 5 and has a length equal to the distance 6 between these beams 4 and 5. This distance is about one-third of the length 109.

For coupling the device with the lifting device when it is standing on the ground, the tractor has simply to be driven rearwardly so that the rear wheels 112 and 113 of the tractor are on either side of the beams 4 and 5. The tractor is maneuvered relatively to the device so that the lowermost lifting arms 50 and 51 get in the proximity by their ends at the fastening means formed by the strips 38, 39 and 40, 41 respectively. Then the lifting arms can be coupled with these fastening means by inserting the pins 52 and 53. The upper lifting arm 54 can be coupled with the fastening strips 45 and 46, which also form coupling means of the device for attaching it to the tractor. The end of the arm 54 is arranged between the strips 45 and 46 and the pin 55 establishes the connection between the arm 54 and the strips 45 and 46 by inserting it into the holes concerned. The device can then be lifted by the lifting device into the position in which it can be carried by the tractor. It is advantageous to have a possibility of locking, for example, the lower lifting arms 50 and 51 in position to prevent lowering of the device. For this purpose the tractor may be provided with a locking member, which is not shown in the drawings. This locking member may be formed by chains coupled with a higher part of the rear bridge of the tractor, the lifting arms being at a distance from the pivotal points 115. The chains may be arranged so that they can be shortened between their fastening points on the tractor and the lifting arms so that the device gets into a higher position relative to the tractor. In this way the device can be moved to the desired height relative to the tractor for transporting and for the distribution of the material.

The re-entrant part 79 is such that in the lowermost position of the device relative to the tractor for normal operation the distance 116 between the rim 83 and the seat 117 of the tractor is so large that the driver can sit down on the seat 117 beneath the parts 81 and 82. The distance 116 is preferably about one meter. The control-members of the dosing mechanism 96 may be arranged so that they can be actuated from the driver seat 117.

With this construction the hopper 2 may have a fairly large capacity so that a great quantity of material can be carried in the hopper for distribution. The hopper 2 has a capacity exceeding 1500 liters. The capacity preferably exceeds 2,000 liters. In the embodiment shown in FIGS. 1 to 3 the capacity of the hopper 2 is about 3,000 liters. As will be seen from the Figures, the construction of the hopper 2 is such that the weight of the device with the filled hopper is located near the rear side of the tractor so that, when the hopper is filled, there is no risk of the tractor tilting rearwardly. For this purpose the hopper 2 is extended in a horizontal direction by the upper portion 61 as far as beyond the lower portion, the projecting portion being located over the rear side of the tractor, when the spreader is coupled with the tractor. The device is constructed so that, when the hopper is filled, the center of gravity is located, on plan, near the fastening means. In this embodiment the center of gravity is located near the vertical plane 118 going through the center lines of the pins 50 and 53 and the center lines of the holes in the strips 38 to 41. In the embodiment shown, when the hopper is filled, the center of gravity 119 is located slightly in front of the vertical plane 118. The center of gravity 119 is located in the plane 47 owing to the symmetrical shape of the device and of the hopper relative to the plane 47.

The fastening means formed by the strips 38 to 41 for the lowermost lifting arms 50 and 51 are located at a lower level than the spreading member 90. Therefore, the distributed material will not be hindered by these fastening means of the device. Moreover, an advantageous support of the device by the lifting arms 50 and 51 is thus ensured.

In order to facilitate supervision on the rear side by the tractor driver, the device or the tractor may be provided on either side with a mirror to provide a view to the rear.

The device can be readily cleaned owing to the simple construction. Cleaning of the dosing mechanism with the spreading member can be facilitated by lowering the spreading member 90 with the gear box 95. For this purpose the locking pin 105 can be removed so that the supporting member 100 can turn downwardly about the pivotal shafts 101. The gear box 95 with the spreading member will sink down relatively to the hopper. The dosing mechanism 96 has a construction such that it can be enclosed between the spreading member and the lower end of the hopper, while it partly surrounds the lower end 69 of the hopper. When the spreading member 90 has been lowered, the dosing mechanism 69 can be removed from the device. All components can thus be readily cleaned. Owing to its connection with the movable supporting member the spreading member can be moved into at least two positions relative to the hopper. The position shown in FIG. 1 is the normal operational position. If desired, the dosing mechanism 96 may be replaced by a closing member, for example, a flap for shutting the lower end of the delivery portion 69. The device can then be readily employed as a conveying device for bulk material, for example, cereals. The cereals may then be delivered from the hopper by removing the closing member, for example, a flap or by inserting a suction duct or a conveyor into the hopper. For example, for removing the transported material in the hopper a worm conveyor may be arranged in the hopper so that the material, for example, cereals, can be delivered. The construction of the hopper, which extends over the tractor seat when the spreader is coupled with the tractor, provides some protection for the driver, for example, against rain and wind. If desired, the hopper 2 may be enlarged with the same construction of the frame, for example, by extending the hopper slightly at the top and at the front. This is indicated by broken lines in FIG. 1. The hopper capacity may thus be increased to about 4,000 liters. The topside of the hopper is then formed by the broken line 120. The wall 70 may be enlarged by the portion 121, indicated by broken lines, in upward direction, whereas the walls 76 and 77 are lengthened up to the broken lines 122 in FIG. 1. The rim 83 and the flat portions 81 and 82 may be held in the position shown in FIG. 1. Thus the center of gravity of the device is slightly shifted to the front so that the larger weight will not bring about a risk of tilting of the tractor when the hopper 2 is completely filled.

Particularly when the capacity of the hopper is thus increased, it is useful to connect the walls on the rear side of the hopper with the walls at the front. For this purpose, as is shown in FIG. 3, reinforcing beams 123 and 124 are provided. The beams 123 and 124 are arranged crosswise so that they intersect each other, on plan, about above the center of gravity 119 of the device. On the rear side of the wall portion 70 a stiffening beam 125 may be provided, which extends over part of the width or over the whole width of the wall portion 70. The beams 123 and 124 may be secured to said beam 125. If desired, large stiffening plates may be arranged on the wall 70 instead of the beam 125, the beams 123 and 124 being then secured to said stiffening plates. The front ends of the beams 123 and 124 are secured to the front wall 62 near the portion where this front wall terminates in the flat portions 76 and 77. The joints of the front ends of the beams 123 and 124 with the wall 62 are located a distance 126 from each other, which is slightly larger than the distance 127 covering the width of the re-entrant part 79. The joints of the beams 123 and 124 with the rear wall 70 are spaced apart by a distance 128, which is slightly larger than the distance 126. The distance 128 is about one-third of the width 110 of the hopper. The width 127 of the re-entrant part 79 is about equal to the width of the seat of the tractor or slightly greater.

Figure 4:
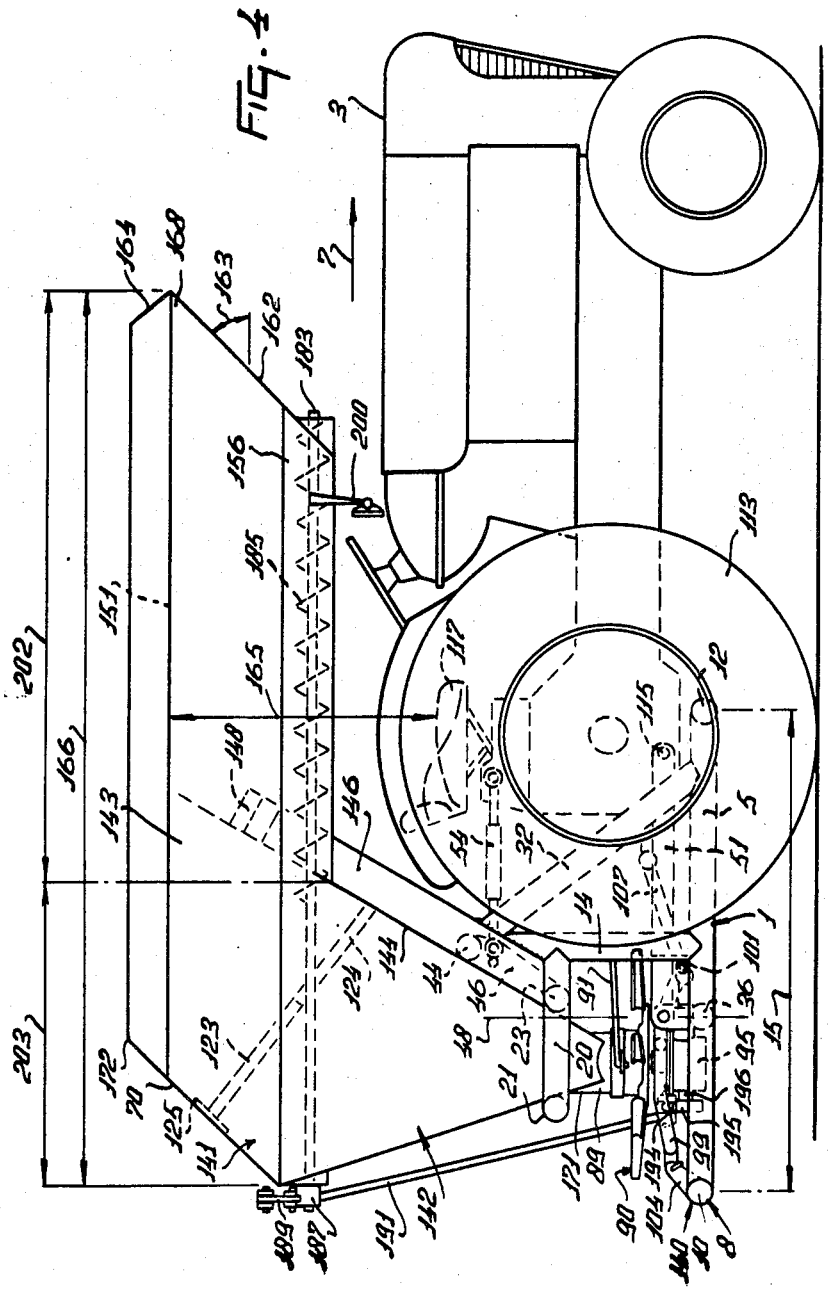
FIG. 4 is a side elevation of a second embodiment of a device in accordance with the invention for distributing, for example, fertilizers.
Figure 5:
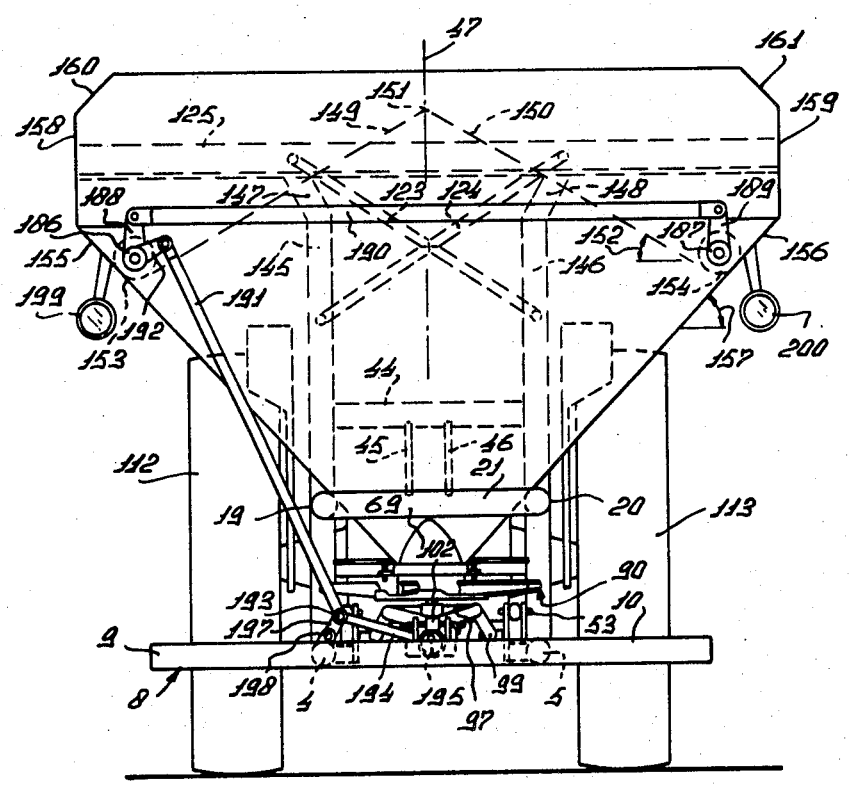
FIG. 5 is a rear view of the device of FIG. 4 taken in the direction of the arrow V in FIG. 4.
Figure 6:
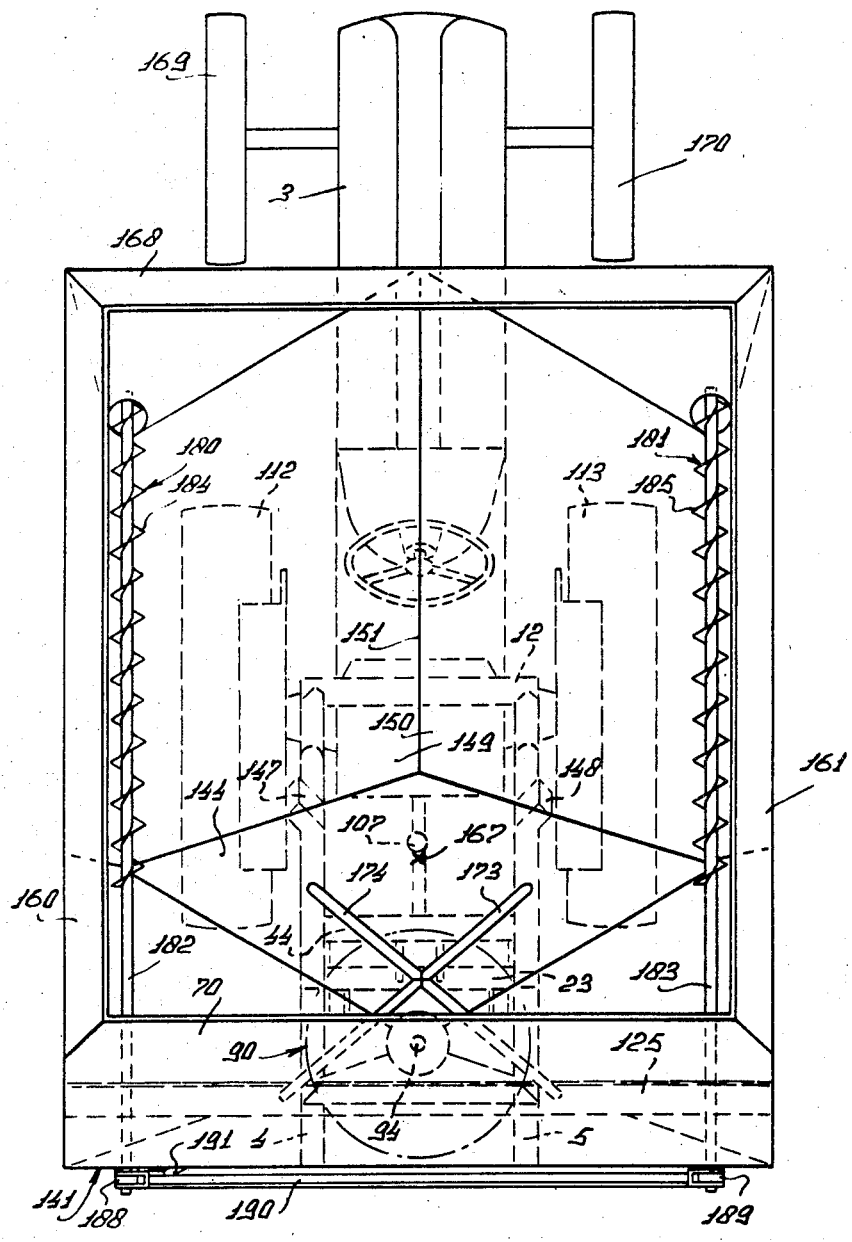
FIG. 6 is a plan view of the device of FIGS. 4 and 5.

FIGS. 4, 5 and 6 show a second embodiment of a device in accordance with the invention. This device comprises a frame 140, supporting a hopper 141. The frame 140 is constructed mainly in the same manner as the frame 1 of the first embodiment. The frame 140 is therefore not described further; corresponding parts of the frame 140 are designated by the same reference numerals as those of the frame 1. The frame 140 is attached to the tractor 3 in the same manner as is shown in the preceding embodiment. A further description of this attachment will therefore be dispensed with for the second embodiment. The hopper 141 comprises a lower portion 142, substantially extending in upward direction and an upper portion 143, extending substantially in a horizontal direction. The portion 142 is formed approximately in the same manner as the portion 60 of the hopper 2 of the preceding embodiment. The portion 142 will therefore not be described further. The upper portion 143 of the hopper is larger than the upper portion 61 of the hopper 2. The front wall 144 of the frame portion 142 has a shape differing from that of the front wall 62 of the hopper 2.

The upper portion 143 extends far to the front. On this side of the device the fastening means for the attachment to the lifting device are arranged. The upper portion 143 extends over a distance 202 beyond the lower portion 142. The distance 202 is about twice the length 203 of the hopper portion 142, viewed in the direction of movement 7. For supporting the hopper the frame is provided with two frame beams 145 and 146, corresponding with the frame beams 24 and 25, the form of the upper parts thereof being, however, different. The upper parts of the frame beams 145 and 146 are prolonged in the direction of height along the wall and their upper ends 147 and 148 are slightly bent outwardly so that they join bottom parts 149 and 150 of the hopper portion 143. These bottom parts 149 and 150 are arranged in roof-like fashion and connected with each other by the rim 151, which is located in the vertical plane 47. From the rim 151 the bottom parts 149 and 150 diverge in downward direction, each of them being at an angle 152 of about 30° to the horizontal plane. The lower sides of the bottom portions 149 and 150 are connected through curved portions 153 and 154 with short, inclined wall portions 155 and 156. These wall portions 155 and 156 are at angles 157 of about 85° to the horizontal plane and, viewed in a rear view of the device (FIG. 5) they are in line with the sidewalls of the hopper portion 142. The sidewalls of the hopper and the wall portions 155 and 156 terminate in vertical wall portions 158 and 159, which are provided above with inclined rims 160 and 161, orientated towards each other. At the front of the hopper a front wall 162 joins the walls 158 and 159 and the bottom portions 149 and 150 and is inclined from the bottom upwardly and forwardly at an angle 163 of about 45° to the horizontal plane. The wall 162 has a rim 164 at the front, which is inclined to the rear and joins the rims 160 and 161. Beneath and between the bottom portions 149 and 150 a recess is formed for accommodating the driver of the tractor 3. The rim 151 is located approximately at the same level as the upper side of the hopper so that between this rim 151 and the seat 117 a distance 165 is left, which is sufficient for the tractor driver.

In this second embodiment the hopper is enlarged so that its capacity amounts to about 5000 liters. The length 166 of this hopper is about twice the length 15 of the beams 4 and 5. In this construction the center of gravity 167 is located farther in front of the vertical plane 48. On plan the center of gravity is, however, located, viewed in the direction of movement 7, behind the beam 12 so that also with this construction of the hopper the frame provides a sufficiently stable support for the device when it is put on the ground. Since the center of gravity in the hopper construction of FIGS. 4 to 6 is located farther to the front, the overall weight of the filled hopper and the device can still be satisfactorily held by the tractor, while there is no risk of tilting rearwardly.

On plan the foremost portion 168 of the hopper is located near the front wheels 169 and 170 of the tractor. The front side 168 is, on plan, approximately level with the rear parts of the wheels 169 and 170. In this embodiment the rear side 171 of the delivery part 69 of the hopper is located, on plan, behind the upper rim 172 of the wall 70 of the hopper. Like in the preceding embodiments it is advantageous to provide stay rods 173 and 174 in the hopper for stiffening the hopper, which rods are similar to the struts 123 and 124 of the preceding embodiment. The stay rods 173 and 174 may be fastened approximately in the same manner so that a further description may be dispensed with.

Also in this embodiment the height of the bottom side 149 and 159 above the lowermost frame beams 4, 5, 8 and 12 of the frame is such the tractor can be driven beneath the forwardly projecting hopper portion for coupling it with the fastening means of the device.

In order to convey satisfactorily the material lying on the bottom portions 149 and 150 towards the lower portion 142 of the hopper, conveying members 180 and 181 are provided above the curvatures 153 and 154 of the bottom portions. The conveying members 180 and 181 are formed by worm conveyors, the front ends of which are journalled in the front wall 172 and the shafts 182 and 183 of which extend above the portion 142 and are journalled in the rear wall of the hopper. The conveyors 180 and 181 comprise helical portions 184 and 185, which extend from the front wall 162 a small distance beyond the rear sides of the curved bottom portions 153 and 154, so that the material can be displaced sufficiently to above the front wall 144. The further wall portions, particularly the hopper portion 142, are sufficiently inclined for the material to slide by force of gravitation along said walls towards the delivery part 69 of the hopper.

The walls in the first embodiment are all inclined to extend such that no conveying means are needed inside the hopper for displacing the material towards the delivery part 69.

The conveying members 180 and 181 are driven by the rear ends of the shafts 182 and 183. The shafts project at the rear beyond the hopper and are provided at this place with free-wheel or pawl mechanisms 186 and 187 respectively so that the arms 188 and 189 connected herewith can drive intermittently the conveying members 180 and 181 by their reciprocatory movement about the center lines of the shafts 183 and 182. The arms 188 and 189 are coupled with a coupling rod 190 so that only one of the arms 188 or 189 need be driven. In this embodiment the arm 188 is driven. This is performed by means of a connecting rod 191, which is pivotal to an arm 192, forming a lever with the arm 188. The connecting rod 191 is pivotable by a pivot 193 and coupled with a connecting rod 194, arranged on an eccentric 195. The eccentric 195 is coupled with a driving shaft 196 journalled in the gear box 197. The pivot 193 is fastened to an arm 197, pivoted by a pivot 189 to the frame beam 4.

Although in this embodiment the conveying members 180 and 181 are driven by a reciprocatory drive, i.e., crank or eccentric mechanism, they may alternatively be driven constantly instead of being driven intermittently.

In order to allow the tractor driver to have a view on the rear, mirrors 199 and 200 are provided at the front of the hopper. These mirrors are arranged so that from his seat the driver can look along the bottom side of the portions 149 and 150 in the mirrors, the reflective sides of which are orientated to the rear.

Also in this embodiment the driver is sheltered by the forwardly projecting hopper portion 141. The hoppers shown comprise parts located mainly at the side of the driver's head, when the spreader is coupled with the tractor for operation.

The construction of the device in accordance with the invention in the foregoing embodiments allows the use of a spreader of heigher hopper capacity for mounting on a tractor. The device need not have a separate mobile frame so that the device may be cheaper. Since the device is coupled with and supported by a tractor, maneuvering is easy so that the range of uses may be extended. The device in this second embodiment may, for example, be used for conveying bulk goods such as cereals, like in the preceding embodiment the delivery part 69 of the hopper can be closed for this purpose by a closing member, for example, a flap. For inserting this flap it is not necessary to remove the dosing member 96. The construction may be such that, when the closing member is put in place, the dosing member can be left in place. The closing member may be formed by a cylindrical pot completely closed at the bottom, whereas the upper side is provided with short, funnel-shaped wall portions fitting to the lower sides of the walls of the hopper portion 142. This closing member can thus be arranged it its place from the upper side in the hopper portion 142 so that the delivery part 69 is closed at the bottom.

When the spreader, particularly useful as an agricultural implement, for example, for distributing fertilizers, is attached to the lifting device of a tractor, the high weight of the device with the filled hopper can be advantageously transferred by the large tractor wheels to the ground without the soil being adversely effected. This is particularly important when the device is used as a fertilizer distributor. The fastening means of the spreader are located so that the center of gravity of the device with the filled hopper is located, on plan, in front of the line passing through the plan 54 and 55, whereas in the first embodiment it is located behind the pin 53. The center of gravity thus lies near the fastening means of the device. The height of the device, measured from the beams 4 and 5 to the upper edge of the hopper, is preferably 200 cms. The hopper has, on plan, preferably an approximately rectangular or square shape. If desired, the hopper capacity may readily be enlarged by arranging the inclined upper side of the rear wall of the hopper in a vertical position.

It will be evident that the invention is not restricted to the embodiments shown in the Figures, but that the invention relates also to varied embodiments lying within the scope of the invention.

Having thus described my invention, what I claim as new and desire to secure by Letters Patent of the United States is:

1. An agricultural implement comprising a frame, a hopper supported on said frame and a spreading member mounted on said frame below an outlet adjacent the bottom of said hopper, fastening means on said frame for attaching said implement to the upper and lower connections of a lifting device of a tractor, said hopper being of relatively large capacity and having a lower, upright portion and an upper, horizontally extending portion, said upper portion extending above and over said fastening means whereby the center of gravity of said hopper, when filled, is located adjacent the upper connection of the lifting device with said fastening means, the upper and lower portions of said hopper having adjoining forward walls that are angled with respect to one another and supported by said frame which coextends, at least in part, with said forward walls.

2. An agricultural implement comprising a frame, a multiwalled hopper arranged on said frame and a spreading member supported on said frame and positioned adjacent a lower outlet in said hopper, said frame being provided with fastening means for attaching said implement to the lifting device of a tractor, said hopper comprising an upright, lower portion and an upper, horizontally extending portion, said portions having forward walls that meet one another with the upper portion being inclined forwardly relative to said lower portion, said frame comprising angled stay beams that conform to the configuration of the forward walls of said portions to support same.

3. An implement as claimed in claim 2, wherein said frame includes lower, horizontally extending beam means and vertical beams connect said lower beam means to said stay beams at the front of said hopper.

4. An implement as claimed in claim 3, wherein said spreading member is supported on said lower beam means and strut means connect said stay beams to said lower beam means adjacent said fastening means.

5. An implement as claimed in claim 2, wherein said stay beams are interconnected with reinforcing beams adjacent the forward wall of said upper portion of the hopper.

6. An implement as claimed in claim 2, wherein the sidewalls of said hopper are inclined over approximately 45° to the horizontal.

7. An implement as claimed in claim 6, wherein the the front wall of said lower portion is inclined over approximately 60° to the horizontal.

8. An implement as claimed in claim 7, wherein the said front wall of said upper portion is inclined over approximately 30° to the horizontal.

9. An implement as claimed in claim 8, wherein, in plan, the upper portion said hopper is approximately square in configuration.

10. An implement as claimed in claim 9, wherein a spreading member comprising an ejecting disc is mounted below an outlet in said hopper.

11. An implement as claimed in claim 10, wherein said frame has two fastening members located at a lower level than the ejecting disc, said fastening members being connectable to the lifting device of a tractor.

12. An implement as claimed in claim 11, wherein, viewed from a side, said two fastening members are located beneath the spreading member.

13. An implement as claimed in claim 12, wherein, on the rear side of the lower portion of said implement, a frame beam extends transversely to be connected to two further frame beams which extend in the direction of travel.

14. An implement as claimed in claim 11, wherein said frame includes a support which extends forwardly beyond said fastening members.

15. An implement as claimed in claim 14, wherein said fastening members are upwardly extending strips secured to said frame.

16. An implement as claimed in claim 14, wherein said fastening members comprise two sets of strips, the strips of each set being spaced from each other, holes being provided at the upper ends of said strips for receiving pins, said pins also being receivable through the arms of a lifting device of the tractor.

17. An agricultural implement comprising a frame, a hopper supported on said frame and a spreading member mounted on said frame below an outlet in adjacent the bottom of said hopper, fastening means on said frame for attaching said implement to the lifting device of a tractor, said hopper being of relatively large capacity and having a lower, upright portion and an upper, horizontally extending portion, said upper portion extending above and over said fastening means whereby the center of gravity of said hopper, when filled, is located adjacent said fastening means, the forward walls of said portions being joined to one another in an angular relationship, the forward wall of said lower portion extending about 30° with a horizontal plane and the forward wall of the upper portion extending about 60° with respect to the horizontal plane, the side walls of said lower portion converging towards one another towards the bottom of said hopper.

18. An agricultural implement comprising a frame, a hopper supported on said frame and a spreading member mounted on said frame below an outlet at the bottom of said hopper, fastening means on said frame for attaching said implement to the lifting device of a tractor, said hopper being of relatively large capacity and having a lower, upright portion and an upper, horizontally extending portion, said upper portion extending above and over said fastening means and lifting device whereby the center of gravity of said hopper, when filled, is located adjacent said fastening means, said portions having forward walls which are angled forwardly relative to a horizontal plane with the forward wall extending at a larger angle to the horizontal plane than the forward wall of the lower portion, said frame including lower, horizontally extending beam means and said beam means comprising a stand for supporting said implement when same is detached from the lifting device of a tractor, the forward part of said beam means extending forwardly to terminate substantially in front of said fastening means.

19. An implement as claimed in claim 18, wherein, in plan, said fastening means is located approximately near the center of said stand, relative to the direction of travel.

20. An agricultural implement comprising a frame, a hopper supported on said frame and a spreading member mounted on said frame below an outlet at the bottom of said hopper, fastening means on said frame for attaching said implement to the lifting device of a tractor, said hopper being of relatively large capacity and having a lower, upright portion and an upper, horizontally extending portion, said upper portion extending above and over said fastening means and lifting device whereby the center of gravity of said hopper, when filled, is located adjacent said fastening means, said portions having forward walls which are angled forwardly relative to a horizontal plane with the forward wall extending at a larger angle to the horizontal plane then the forward wall of the lower portion, said upper portion of the hopper extending over and above the rear wheels of the tractor when viewed in plan and said frame being connected to said upper portion to coextend and support same at its forward aspect.

21. An implement as claimed in claim 20, wherein the capacity of said hopper is at least 2,000 liters.

22. An implement as claimed in claim 21, wherein the capacity of said hopper is about 3,000 liters.

23. An agricultural implement comprising a hopper supported on a frame, said hopper having an upper horizontally extending portion connected to a lower, substantially upright portion, said frame having fastening means for connecting the implement to the three point of lifting device of a tractor and said upper portion extending substantially forwardly of said fastening means over and above the rear wheels of the tractor, horizontally extending conveying means being located in the upper portion of said hopper to convey material rearwardly, to said lower portion, said lower portion having sloping side walls which converge to an outlet at the bottom of said hopper and a rotatable spreading member being mounted on said frame below said outlet.

24. An implement as claimed in claim 23, wherein at least one worm conveyor member of said conveying means is arranged in said upper portion.

25. An implement as claimed in claim 24, wherein there are two worm conveyor members positioned in the upper portion of said hopper.

26. An implement as claimed in claim 25, wherein said conveyor members extend parallel to each other on either side of said implement.

27. An implement as claimed in claim 26, wherein said conveyor members are driven by means of a crank mechanism.

28. An implement as claimed in claim 27, wherein said crank mechanism is connected and driven by the drive to said rotatable spreading member, said rotatable spreading member being positioned below said hopper and being connected to a power takeoff.

29. An implement as claimed in claim 28, wherein the drive of the spreading member includes a gear box, from which said crank mechanism is driven.

30. An implement as claimed in claim 23, wherein the upper portion of said hopper extends over and on either side of the driver seat of said tractor.

31. An implement as claimed in claim 30, wherein the front of said hopper has a reentrant portion which can accommodate a driver's head.

* * * * *